D. W. HANKS.
WEED PULLER.
APPLICATION FILED MAY 13, 1920.
1,363,112. Patented Dec. 21, 1920.
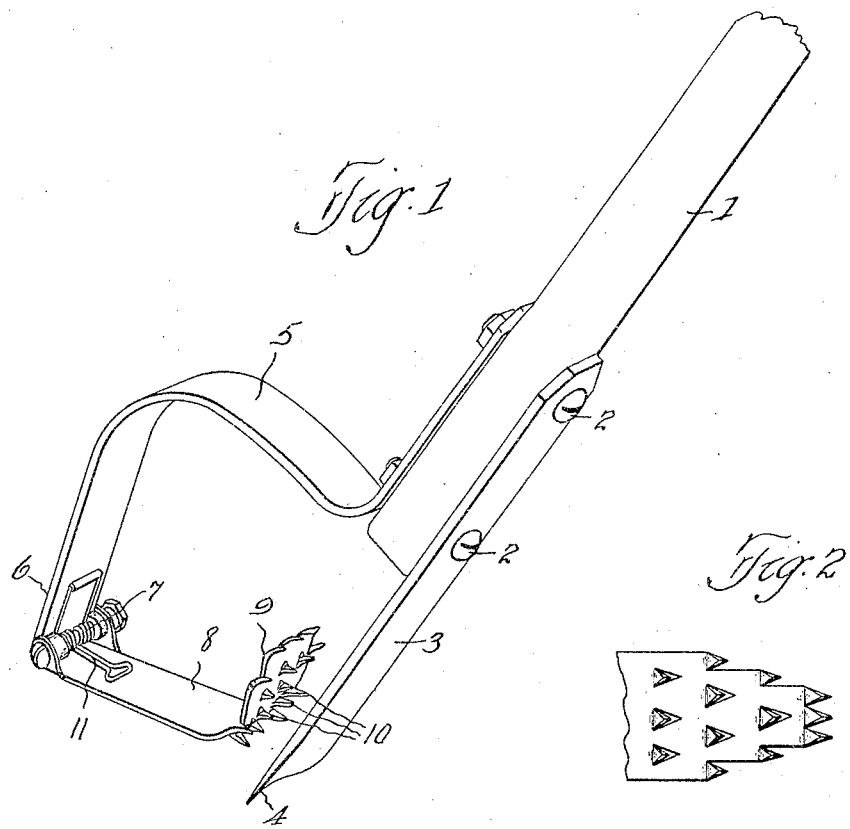
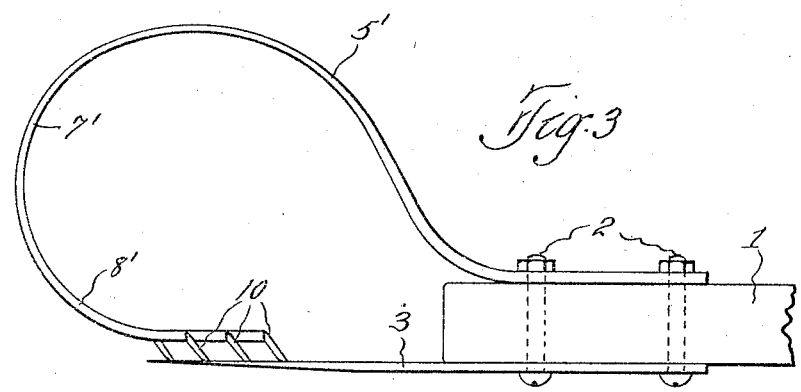
Inventor
D. W. Hanks

UNITED STATES PATENT OFFICE.

DAVID W. HANKS, OF DAVENPORT, IOWA.

WEED-PULLER.

1,363,112.   Specification of Letters Patent.   Patented Dec. 21, 1920.

Application filed May 13, 1920. Serial No. 380,996.

*To all whom it may concern:*

Be it known that I, DAVID W. HANKS, a citizen of the United States, residing at Davenport, in the county of Scott, State of Iowa, have invented certain new and useful Improvements in Weed-Pullers; and I do hereby declare the following to be a full, clear, and exact description of the invention, such as will enable others skilled in the art to which it appertains to make and use the same.

This invention relates to diggers, and more especially to stalk pullers; and the object of the same is to produce a hand implement for extracting weeds, as by pulling dandelions and similar foreign growth from the sod.

Heretofore implements of this same general type were made in the form of a fork whereof one arm constituted a blade and the other arm a finger capable of movement laterally toward the blade and of coaction with it like the jaws of a pair of tongs, to pick the weed or root or to extract it from the soil or sod. The present invention is distinguished from this type of implements in that it uses with a projecting blade a serrated jaw forming part of a receding rather than a projecting member, spring-pressed normally toward the blade for automatic rather than manual coaction therewith. The implement has a long staff or handle which permits the user to stand upright, and as it operates automatically when properly manipulated to grasp the weed, extract it from the ground, and release it, a considerable volume of work can be accomplished.

Details are set forth below and shown in the drawings wherein:

Figure 1 is a perspective view of this improved weed puller.

Fig. 2 is a detail of the face of the jaw.

Fig. 3 is a side elevation showing a slight modification.

The numeral 1 designates a staff or handle as of wood and which by preference has considerable length and may have an appropriate hand hold at its upper end. To its lower end by bolts 2 or otherwise is attached a fork which may be in one or two pieces as preferred, but is herein shown as made up of two separate pieces or members. The lower fork-arm is a straight blade 3 having a cutting edge 4 at its front end. The upper fork-arm rises above the line of the handle and may be well called an arch 5, its front end 6 extending somewhat beyond the front end or cutting edge 4 of the shorter fork-arm or blade 3. Formed as part of, attached to, or by preference hinged at 7 to the front end 6 of the arch 5 is a barb 8 herein shown as having a jaw 9 at its lower end, formed by deflecting the lower portion out of alinement with the body portion; but the entire element recedes from its point of connection with the longer arm 5 to its point of contact with the shorter arm 3. The contacting face of the jaw is also retroserrate, being herein shown as provided with receding teeth 10. This element is also reflexible, because it may swing into the space between the arms as seen in Fig. 1. If the element is hinged to the arm 5, a spring 11 will be employed to throw the free or jaw end of the barb normally forward and downward. Excepting the staff, the parts are by preference of metal.

In the use of this implement, the operator grasps the staff and forces the cutting edge of the blade obliquely into the ground alongside the root of a weed which it is desired to destroy, generally driving said edge completely through the root and well into the soil on the other side of it. In this action the barb is caused to flex inward when the jaw is forced down onto the top of the weed or plant. Now when the operator withdraws the blade, the jaw coacts with the blade to grasp the plant, the teeth 10 entering the same as seen in Fig. 2, and all that portion of the same above the line where the root was cut off is extracted quickly from the earth by an upward pull on the handle. The operator then proceeds to the next weed and repeats the operation, and as the blade is forced into the ground this time the plant which was formerly held by the jaw is ejected from it as the second plant is driven upward under the teeth; therefore at each movement of the tool after the first, the plant formerly extracted is automatically thrown out of the fork, and later the operator can pass along the line and pick up the weeds. It will be observed that only one arm of the fork is stuck into the ground, and therefore there is as little injury to the sod as possible. Particularly it should be observed that the action of the barb and its toothed jaw is automatic, rather than dependent upon any manual action on the part of the operator other than the thrust of the tool forward into the ground and the pull of the tool upward out of the ground.

In Fig. 3 the arch 5' is shown as integrally united at 7' with the barb 8', this view therefore illustrating the fact that the hinge and separate spring might be done away with.

What is claimed is:

1. An implement of the class described comprising a handle, a fork at the lower end thereof whereof one arm is a blade with a cutting extremity and the other arm projects beyond the first, and a receding barb carried by the longer arm and retroserrate on that face next the blade.

2. An implement of the class described comprising a handle, a fork at the lower end thereof whereof one arm is a blade with a cutting extremity and the other arm projects beyond the first, and a reflexible barb mounted at one end on the longer arm and having a jaw at its other end lying normally alongside the blade.

3. An implement of the class described comprising a handle, a fork at the lower end thereof whereof one arm is a blade with a cutting extremity and the other arm projects beyond the first, a barb connected at one end to the outer end of the longer arm and receding thence toward the blade and deflected into a jaw alongside the latter, and yielding means throwing the jaw toward the blade.

4. A weed puller comprising a handle, a straight blade projecting from its lower end and having a cutting extremity, an arch also carried by said lower end and rising from and projecting beyond the extremity of the blade, a barb hinged at one end to the outer end of said arch and receding thence and formed with a jaw for coaction with the blade, and a spring swinging the barb normally forward and its jaw toward the blade.

5. A weed puller comprising a handle, a straight blade projecting from its lower end and having a cutting extremity, an arch also carried by said lower end and rising from and projecting beyond the extemity of the blade, a barb inclined from the outer end of the arch downward and inward toward the blade and deflected thence into a jaw, the jaw having retroserrate teeth, and a spring hinge connecting the arch and barb and swinging the latter and its jaw normally toward the blade.

In testimony whereof, I affix my signature, in the presence of two witnesses.

DAVID W. HANKS.

Witnesses:
J. A. HANLEY,
ELOISE HANLEY.